(No Model.)

C. C. SOUTHWELL.
TOOTHPICK.

No. 516,409. Patented Mar. 13, 1894.

Witnesses.
Anna V. Faust,
C. H. Keeney.

Inventor.
Charles C. Southwell
By Baudin Morsell
Attorneys.

UNITED STATES PATENT OFFICE.

CHARLES C. SOUTHWELL, OF MILWAUKEE, WISCONSIN.

TOOTHPICK.

SPECIFICATION forming part of Letters Patent No. 516,409, dated March 13, 1894.

Application filed March 27, 1893. Serial No. 467,862. (No model.)

*To all whom it may concern:*

Be it known that I, CHARLES C. SOUTHWELL, of Milwaukee, in the county of Milwaukee and State of Wisconsin, have invented a new and useful Improvement in Toothpicks, of which the following is a description, reference being had to the accompanying drawings, which are a part of this specification.

The object of my invention is to provide a tooth pick in such form as to be adapted for convenient use especially for the purpose of removing foreign matter from between the teeth particularly at the side of the jaw; that is soft and yielding at and near the point that comes into contact with the teeth; that is non-corrosive under the action of liquids or acids, and that is strong and enduring in quality.

The invention consists of the novel device constructed of the materials and formed, arranged and combined substantially as hereinafter described, or their equivalents.

Figure 1:
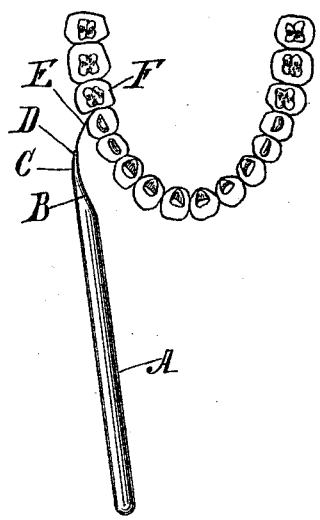
Figure 2:
Figure 3:

In the drawings, Figure 1, is a view of my improved tooth pick in connection with the teeth of a lower jaw, showing the convenience and adaptability of the tooth pick for use therewith. Fig. 2, is a view of the same tooth pick taken at a right angle to the view shown in Fig. 1. Fig. 3, is a detail of the point of the tooth pick.

To obviate weight, liability to the action of acids, and expensiveness of construction, the handle A of my improved tooth pick is formed of celluloid, or analogous material as for example rubber or the material known as "florentine" and preferably of cylindrical form and small diameter. Near the front end the handle is beveled off at B providing a space in front of the shank C, in the line of the principal part of the handle, and at its extreme front end the shank at D is bent or turned forwardly at an oblique angle to the axis of the handle. A point E (shown in detail in Fig. 3) is fixed rigidly in the extremity D of the shank and projects therefrom in the line of the axis of the part D. This point is of suitable length to enter between the teeth for removing foreign matter therefrom. The oblique arrangement of the point with reference to the handle adapts the tooth pick to be conveniently inserted in the mouth and to be passed, at the side of the mouth, to the rear or molar teeth between which the point of the pick can be readily inserted by lateral movement as will be seen by reference to Fig. 1, in which the relation of the tooth pick to the teeth F and to the mouth will be seen and understood.

The point E is preferably formed of a piece of quill and is provided with apertures G G. The point is conveniently and securely fixed in the handle by splitting the portion D of the shank longitudinally and inserting the point therein and then the furcate parts of the portion D are pressed together under heat or in hot dies or clamps, causing the celluloid of the shank to enter the apertures G G and to close together in the apertures and at the sides of the point E within the shank and thus form a rigid and secure union of the point to the handle. It is desirable that the point of the tooth pick should be of strong and tenacious material which also should be soft and pliable to adapt it to contact with the teeth without injury thereto, and these features are secured in the quill point E.

The handle A being constructed of celluloid or analogous material is light in weight, strong and enduring in quality, is comparatively inexpensive of production, can be readily shaped into the form desired, and being solid, rather than hollow, does not become a receptacle to gather and hold foreign matter such as is liable to get into the handles of hollow tooth picks carried loose in the pocket, which foreign matter thus accumulated is liable to be drawn into the mouth by the breath or otherwise when the tooth pick is used.

The convenience and adaptability of my improved tooth pick for use, by reason of the cutting away of the handle at B and C and of the bending it forward at D and inserting the point at an oblique angle to the axis of the handle will readily be understood by reference to Fig. 1, by which it will be seen that the tooth pick can be inserted in the mouth and the point be forced laterally between the back teeth while the handle is at the front of the jaw, instead of being placed in radial position with reference to the curvature of the jaw, as would be required with a tooth pick having a point in line with its axis. And the tooth pick is not only peculiarly well adapted for use as just stated, but by reason of its general conformation, it is nicely adapted for removing foreign matter from between any two teeth, being capable of reaching the interspaces at the sides of either jaw, both from without and from within, with equal facility, and enabling the user to reach from within the arch, the interspaces of the anterior teeth of either jaw. It will also be noted that while the point is pliable to a limited extent, though hard in the sense of being horny thus adapting it for contact with the teeth without injury thereto, the handle is rigid up to the junction of the point therewith, thus rendering the implement capable of being used with considerable force in removing accumulations from between the teeth. Also as the handle is round and polished its contact with and pressure against the lips or ends of the mouth is easy and unobjectionable.

What I claim as my invention, and desire to secure by Letters Patent, is—

1. A tooth pick, comprising a comparatively rigid handle of celluloid or analogous material, and a slightly elastic quill point fixed rigidly in the extremity of the handle and projecting therefrom at an oblique angle to the axis of the handle, the quill point being secured in the handle by being inserted therein and fixed thereto by parts of the handle clasped about the quill and projecting through apertures therein, such construction being obtained by compressing the material of the handle into and about the quill while the material is in a semi-plastic condition produced by heat or otherwise, substantially as described.

2. A tooth pick comprising a solid handle of celluloid or analogous material, the front extremity of which is beveled off rearwardly to a shank, a shank integral with the handle projecting therefrom in the line of the rear part of the handle, and bent or curved forwardly at its extremity toward the front, and a quill point fixed rigidly in the extremity of the shank, substantially as described.

In testimony whereof I affix my signature in presence of two witnesses.

CHARLES C. SOUTHWELL.

Witnesses:
C. T. BENEDICT,
ANNA V. FAUST.